(12) United States Patent
Azvine et al.

(10) Patent No.: US 7,836,077 B2
(45) Date of Patent: Nov. 16, 2010

(54) DOCUMENT SEARCHING TOOL AND METHOD

(75) Inventors: Behnam Azvine, Ipswich (GB); Simon J Case, Bristol (GB); Zhan Cui, Colchester (GB)

(73) Assignee: British Telecommunications plc, London (GB)

( * ) Notice: Subject to any disclaimer, the term of this patent is extended or adjusted under 35 U.S.C. 154(b) by 304 days.

(21) Appl. No.: 11/883,380

(22) PCT Filed: Feb. 2, 2006

(86) PCT No.: PCT/GB2006/000359

§ 371 (c)(1),
(2), (4) Date: Jul. 31, 2007

(87) PCT Pub. No.: WO2006/082410

PCT Pub. Date: Aug. 10, 2006

(65) Prior Publication Data

US 2008/0140657 A1     Jun. 12, 2008

(30) Foreign Application Priority Data

Feb. 3, 2005    (GB) .............................. 0502259.5

(51) Int. Cl.
*G06F 7/00* (2006.01)
(52) U.S. Cl. ...................................... 707/771; 707/732
(58) Field of Classification Search ......... 707/705–718, 707/723–741, 765–769, 770–775, 748–752
See application file for complete search history.

(56) References Cited

U.S. PATENT DOCUMENTS

| | | | |
|---|---|---|---|
| 5,857,179 A | 1/1999 | Vaithyanathan et al. | 707/2 |
| 5,924,090 A | 7/1999 | Krellenstein | 707/5 |
| 6,385,600 B1 | 5/2002 | McGuinness et al. | 707/3 |
| 6,385,602 B1 | 5/2002 | Tso et al. | 707/3 |
| 2002/0078016 A1* | 6/2002 | Lium et al. | 707/1 |
| 2003/0088553 A1 | 5/2003 | Monteverde | 707/3 |
| 2003/0131070 A1 | 7/2003 | Stroebel et al. | 709/217 |
| 2005/0065908 A1* | 3/2005 | Silverbrook et al. | 707/1 |
| 2005/0160107 A1* | 7/2005 | Liang | 707/100 |
| 2006/0074980 A1* | 4/2006 | Sarkar | 707/104.1 |

(Continued)

FOREIGN PATENT DOCUMENTS

EP     1 217 542 A1     6/2002

(Continued)

OTHER PUBLICATIONS

GB0502259.5 UK Patent Search Report datsed Apr. 28, 2005.

(Continued)

*Primary Examiner*—Wilson Lee
(74) *Attorney, Agent, or Firm*—Nixon & Vanderhye PC

(57) ABSTRACT

A store of electronic documents is automatically searched by controlling a user interface to permit a user to enter a search term, carrying out a search using the search term, the documents returned by the search into a plurality of distinct categories, and controlling the user interface to present in a left-hand panel the plurality of distinct categories and in a right-hand panel the documents returned by the search, or references thereto, in a grouped manner such that documents, or references thereto, of a particular category are grouped together, wherein the categories are selected in dependence upon the search term.

9 Claims, 5 Drawing Sheets

U.S. PATENT DOCUMENTS

2009/0018891 A1* 1/2009 Eder .................. 705/10

FOREIGN PATENT DOCUMENTS

| WO | WO 01/46870 A1 | 6/2001 |
| --- | --- | --- |
| WO | WO 02/41190 A2 | 5/2002 |
| WO | WO 02/41190 A3 | 5/2002 |

OTHER PUBLICATIONS

Sizov et al., "BINGO!: Bookmark-Induced Gathering Information," Web Information Systems Engineering, 2002, (WISE'02), Proc. Of the 3$^{rd}$ Intl. Conf. on Web Information Systems Engineering, p. 323-332, 2002, XP010632805.

Anonymous: "Taxonomized Web Search," IBM Technical Disclosure Bulletin, IBM Corp., NY, U.S. vol. 40, No. 5, May 1, 1997, XP002133594.

Chen, H. et al., Association for Computing Machinery© : "Bringing Order to the Web: Automatically Categorizing Search Results," CHI 2000 Conference Proc., Conference on Human Factors in Computing Systems, The Hague, Netherlands; CHI Conf. Proc. Human Factors in Computing Systems, New York, NY, p. 145-152, 2000, XP001090172.

Wu et al., "Question-driven Classification of Retrieved documents," User Interface Conference, 2000, First Australasian Canberra, ACT Australia, 2000, Los Alamitos, CA, USA, IEEE Comput. Soc. U.S. 2000, p. 134-140, XP010371187.

Pratt et al., "A Knowledge-Based Approach to Organizing Retrieved Documents," Proc. Natl. Conf. on Artificial Intelligence, p. 80-85, 1999, XP008019986.

Blake et al., "Multiple Categorization of Search Results,"Proc./ AMIA . . . Annual Symposium [Online] 2000, p. 81-85, XP002387150.

Miller et al., "Introduction to WordNet: An On-line Lexical Database," p. 1-86, 1993, XP002387151.

Chuang et al., "A Fast Algorithm for Hierarchical Text Classification," circa 1999.

Khan et al., "Audio Structuring and Personalized Retrieval Using Ontologies," Dept. of Computer Science and IntegratEd Media Systems Center, Univ. of S. CA, Los Angeles, 0/7695-0659-3/00; 2000 IEEE, p. 116-126.

Pretschner et al., "Ontologhy Based Personalized Search," Inst. for Tech. Inf., München, Germany, Dept. of EECS, Univ. of Kansas, Lawrence KS, 0-7695-0456-6/99, IEEE 1999.

Chaffee et al., "Personal Ontologies for Web Navigation," Dept. of EECS, Lawrence, KS, circa 2000.

Lacher et al.,. "Enabling personal perspectives on heterogeneous information spaces," Stanford University Database Group, Technical University München, 0-7695-1269-0/01 2001 IEEE.

Huhns et al., "Personal Ontologies," Internet Computing Mag., Agents on the Web, http://computer.org/internet, Sep./Oct. 1999.

Fernandes et al., (Abstract) "An ontology-based approach for organizing sharing, and querying knowledge objects on the Web," Proc. 14$^{th}$ Intl. Workshop on Database and Expert Systems App. 2003, IEEE Comput. Soc. pp. 604-609.

Kalfoglou et al., "*myPlanet*: an ontology-driven Web-based personalized news service," Knowledge Media Institute(KMI), The Open Universithy, Milton Keynes, UK, circa 2001.

Papers from PCT/GB2006/000359 (parent PCT): PCT/ISA/228 (Aug. 10, 2006) and Annex thereto; PCT/ISA/210—Notification and International Search Report, PCT/ISA/237—Written Opinion (Jul. 10, 2006).

Cui, H. et al., "Hierarchical Structural Approach to Improving the Browsability of Web Search Engine Results," Database and Expert Systems Applications, Proc. 12$^{th}$ Intl. Workshop (2001), pp. 956-960, XP010558856.

\* cited by examiner

US 7,836,077 B2

DOCUMENT SEARCHING TOOL AND METHOD

This application is the US national phase of international application PCT/GB2006/000359 filed 2 Feb. 2006 which designated the U.S. and claims benefit of GB 0502259.5, dated 3 Feb. 2005, the entire content of which is hereby incorporated by reference.

FIELD OF THE INVENTION

The present invention relates to a document searching tool and method. In particular, it relates to an electronic document searching tool and method which is intended to be used in searching through large electronic databases storing a large number of electronic documents.

BACKGROUND

There is an increasingly large amount of information stored electronically. In addition, there is an increasing tendency for the data of different databases to be made available to casual searchers. For example, the Internet, which comprises a large number of different servers storing diverse information, is continually expanding both because more and more data is being written to Internet servers and because more and more organisations are connecting their databases to the Internet and thus making the information contained on these available via the Internet.

In order to enable users to sift through this mass of information and find a relevant document amongst the vast sea of irrelevant documents, much effort is being expended amongst the Information Technology community to research and develop searching methods and tools to tame the resulting, so-called "data-overload information-poverty" problem.

Most search tools used for finding electronic documents on the Internet are keyword based searches and these will tend to return an unmanageably large number of hits for any reasonably general query comprising one or merely a few keywords (at least where these are reasonably common words). Even more sophisticated search tools employing refined categorisations of document contents, etc., will tend to return a large number of "hits" for any fairly general query because they tend fundamentally to be keyword based search tools, nonetheless.

One of the reasons for this problem is simply the vast amount of data which a computer is able to process very quickly in order to produce a very large list of hits. Compare the performance of a typical Internet search engine which is likely to produce tens of thousands of results for a simple query such as "Hercules" with a human librarian who would at most typically produce two or three "hits". However, prior to carrying out the "search" a human librarian would probably check whether the reader meant the legendary Greek Hero, or something entirely different (e.g. a commercial organisation with that name, a computer program, etc.) and the human librarian would almost certainly find something of relevance to the reader.

It is therefore clear that a human librarian can often outperform an Internet Search engine because he or she is able to ask intelligent questions of the person requesting the search and thus to exclude large sections of the overall "library" of documents which might be classified as "hits" on the basis of a simple key-word search alone. Such an ability is beyond the capacity of current computers to emulate with any great success and therefore alternative technical solutions are required to enable computers to improve on their searching capability, or more precisely, on their ability to assist a user/requester in finding one or two documents which are especially relevant or of interest to the user/requester from amongst a large number of possible documents typically found using a simple keyword based search, taking advantage of the technical strengths of computers whilst seeking to overcome their respective weaknesses (in particular their lack of intelligence).

U.S. Pat. No. 6,526,440 describes a system whereby the results of a search are re-ranked according to the frequency with which the returned documents are cited by other documents. In other words, this document describes a method of re-ranking documents based on meta-information (i.e. information which is about the documents) rather than simply relying on the information contained within the documents.

Vivisimo has produced a search engine called "Clusty" and currently available at http://clusty.com in which the results of any particular search are clustered together into related categories.

WO 01/46870 filed by Amazon.com describes a system for placing the results of a search into corresponding categories (each result have been pre-assigned to a particular category— e.g. book, CD, etc.) and for determining the order in which to present the different categories to the user in accordance with various rules (e.g. by calculating a ratio of number of results from a particular category to number of items in that category and ranking the categories according to the value of this ratio in respect of each category).

U.S. Pat. No. 6,385,602 describes a system similar to the Clusty search engine described above in which after carrying out a search, the results are clustered and based on the clustering dynamic categories are defined and used for presenting the results to the user.

US 2003/0088553 describes a system in which a first database stores a predefined set of categories, a second database stores a set of "anticipated search terms" and mappings to one or more of the predefined categories, and a third database stores mappings between the categories and various internet web-sites (i.e. the web-sites are pre-categorised into one or more of the pre-defined categories). A search then proceeds by assigning an input search query to a category and then retrieving all of the web-sites (or links or titles thereto) pre-categorised into the respective category(ies) corresponding to the input search query. Note that this activity represents the entirety of the search process, thus at no stage is a keyword style search carried out, nor are the results of such a search then categorised into a plurality of separate categories, rather the result of the search is simply the sum of web-sites categorised as belonging to whichever category(ies) the input search query is matched.

EP 1 217 542 describes a system in which a mobile communications device (e.g. a mobile telephone) includes a personalised ontology which is used to help a user to identify favourite services by storing these (or links to them) in corresponding nodes of the personalised ontology. The description is somewhat unclear about exactly how a search is carried out, but it appears (especially from FIG. 6) that it proceeds by firstly looking for results to the search request from the personalised ontology and if this fails then a general search engine is used to look for appropriate results to the search (see items 616, 618 and 620). There is no discussion of how results of a search are displayed to the user or whether the results are categorised according to the personalised ontology before displaying them to the user.

SUMMARY OF THE INVENTION

According to a first aspect of the present invention, there is provided a method of automatically searching through a store of electronic documents in order to assist a user in finding a small subset of the total documents available to the user which are of especial interest to the user (at that moment), the method comprising, controlling a user interface to permit a user to enter a search term comprising one or more keywords, carrying out a keyword based search using the search term, categorising the documents returned by the search into a plurality of distinct categories, and controlling the user interface to present the documents returned by the search, or references thereto, in a grouped manner such that documents of a particular category are grouped together, wherein the categories are selected and/or dynamically generated in dependence upon the search query.

Preferably the categories are selected and/or dynamically generated by processing the search query together with a common ontology or set of ontologies. Preferably the common ontology or set of ontologies is personalised according to preferences associated with the user.

Preferably at least one or some of the categories are dynamically generated from the ontology by combining concepts from the ontology to form compound categories. For example, if a first concept in the ontology (e.g. concept A) has an attribute (e.g. Attribute B) which corresponds to a second concept in its own right in the ontology (e.g. Concept B), which second concept has a number of sub-concepts or daughters (e.g. sub-concepts b1, b2, b3) then the selected categories may include compound categories formed by combining the sub-concepts of the second concept with the first concept (e.g. to form categories b1A, b2A and b3A into which retrieved documents which are instances of A and have attributes of types b1, b2 and b3 are categorised respectively). For example, an ontology might include the concept "restaurant" with attributes "cuisine style", "location" and "telephone number" of which at least "cuisine style" might be a concept in the ontology in its own right with sub-concepts "Indian", "Modern European", "British" and "Vegetarian", etc. in which case at least the following compound categories could be formed "Indian Restaurant", "Modern European Restaurant", "British Restaurant" and "Vegetarian Restaurant". Note that if a third concept were also to have "cuisine style" as an attribute (e.g. the concept "Cookery book"—perhaps itself a sub-concept of the concept "book") then similar compound categories could be formed based on this third concept (e.g. "Indian Cookery book", etc.).

Preferably, the method further includes selecting preferred categories for presenting to the user more prominently based on historical actions of the user and dynamically adjusting the presentation of categories to the user to alter the prominence with which categories are displayed based on the user's actions. Examples of this will be set out in greater detail in the specific description following.

Many different methods of presenting the results of the search to the user may advantageously be employed, depending on the nature of the results. If there are a large number of different categories within which the results are deemed to fall, it may be appropriate to initially display to the user only the categories rather than any actual documents (or references thereto). Where there are only a few different categories, it may be appropriate to display some actual documents (or references thereto), but to clearly indicate the category to which they belong, etc.

Preferably, the method includes using the stored history of the user's previous actions in combination with hierarchical information contained in the ontology, to generate a new set of categories to present to the user which are generated by expanding an attribute of one category in accordance with the stored hierarchy of the concept in the ontology to which the attribute refers to generate multiple sub-categories, and grouping search results in accordance with the values of the selected attribute into respective sub-categories. An example of this is set out below in the specific description.

It will be apparent that a typical implementation of this method will involve installing and executing a computer program running on a server computer to which remote computers have access. Thus the step of controlling a user interface, both to permit a user to enter a search term and to present the results of the search to the user, may be performed by creating and transmitting to the remote computer at which the user is located Hyper Text Mark-up Language (HTML) pages including active links to other documents accessible by the remote computer (e.g. over the Internet) and, in order to allow the user to enter a search term, including a text entry field the contents of which may be transmitted by the remote computer to the server on which the computer program implementing an embodiment of the present invention is running, for example by means of an HTML request from the remote computer including the contents of the text field (possibly in a pre-processed manner).

According to a second aspect of the present invention, there is provided a server computer for assisting a user, using a remote device, to select a subset of documents from a set of documents available to the user stored on devices connected to the same data network to which the server and the remote device are connected, the server including means for receiving from the remote terminal a search term comprising one or more keywords, means for carrying out a keyword based search using the search term, means for categorising the documents returned by the search into a plurality of distinct categories, and means for returning output data to the remote terminal which permits the remote terminal to present to the user the documents returned by the search, or references thereto, in a grouped manner such that documents of a particular category are grouped together, wherein the categories are selected in dependence upon the search query.

Further aspects of the present invention include a computer program or a suite of programs for carrying out the method of the first aspect of the present invention and carrier means carrying such a program or programs.

BRIEF DESCRIPTION OF THE FIGURES

In order that the present invention may be better understood, embodiments thereof will now be described, by way of example only, with reference to the accompanying drawings in which.

DETAILED DESCRIPTION OF AN EMBODIMENT

Figure 1:
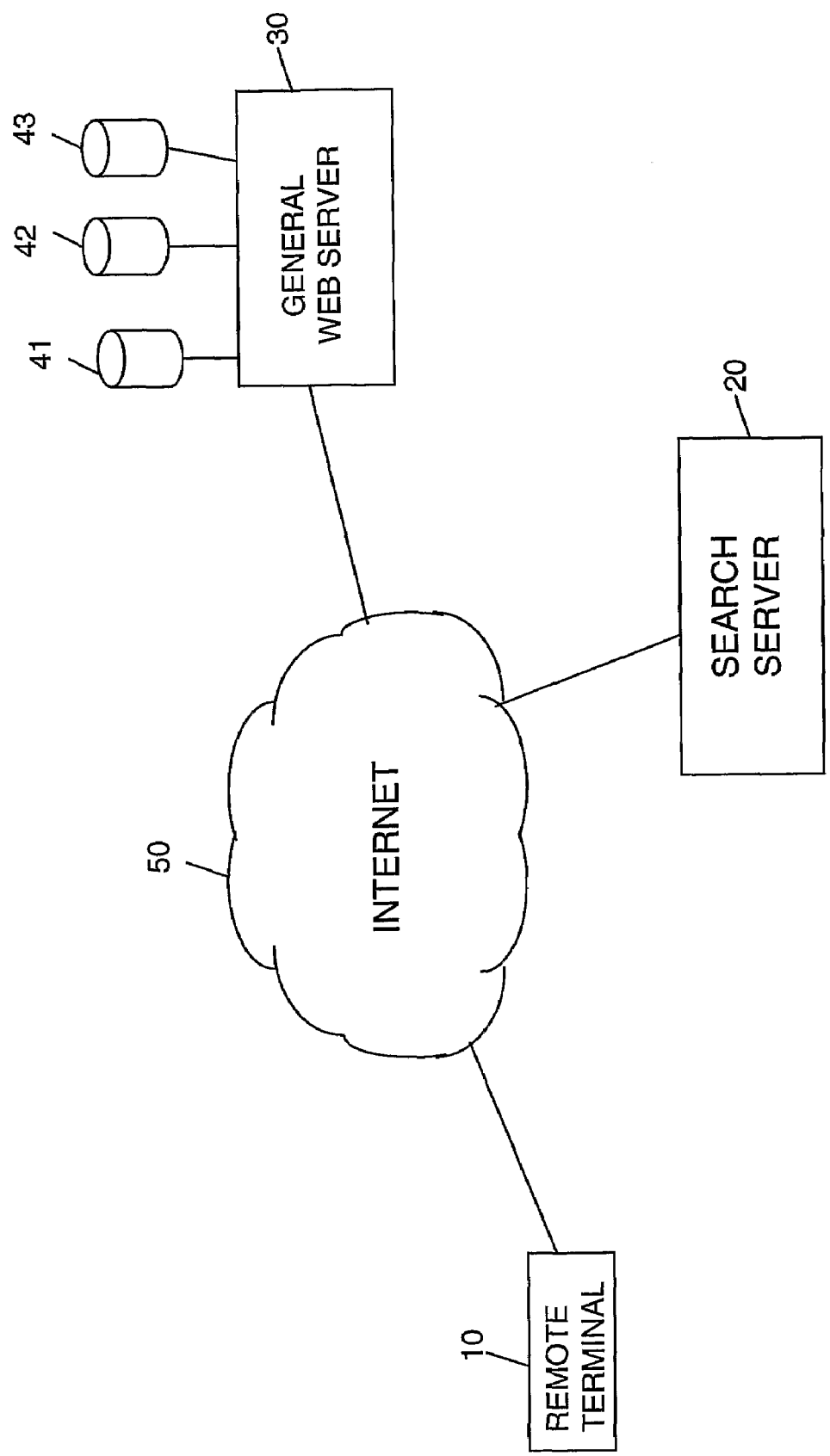
FIG. 1 is a block diagram of a system implementing an embodiment of the present invention.

Referring to FIG. 1, the system comprises a remote terminal 10 which is connected via the Internet 50 to a search server 20. Additionally connected to the Internet 50 are a number of general web servers 30, each of which may be connected to a number of databases 41, 42, 43 storing electronic documents available for access via the Internet 50.

Figure 2:
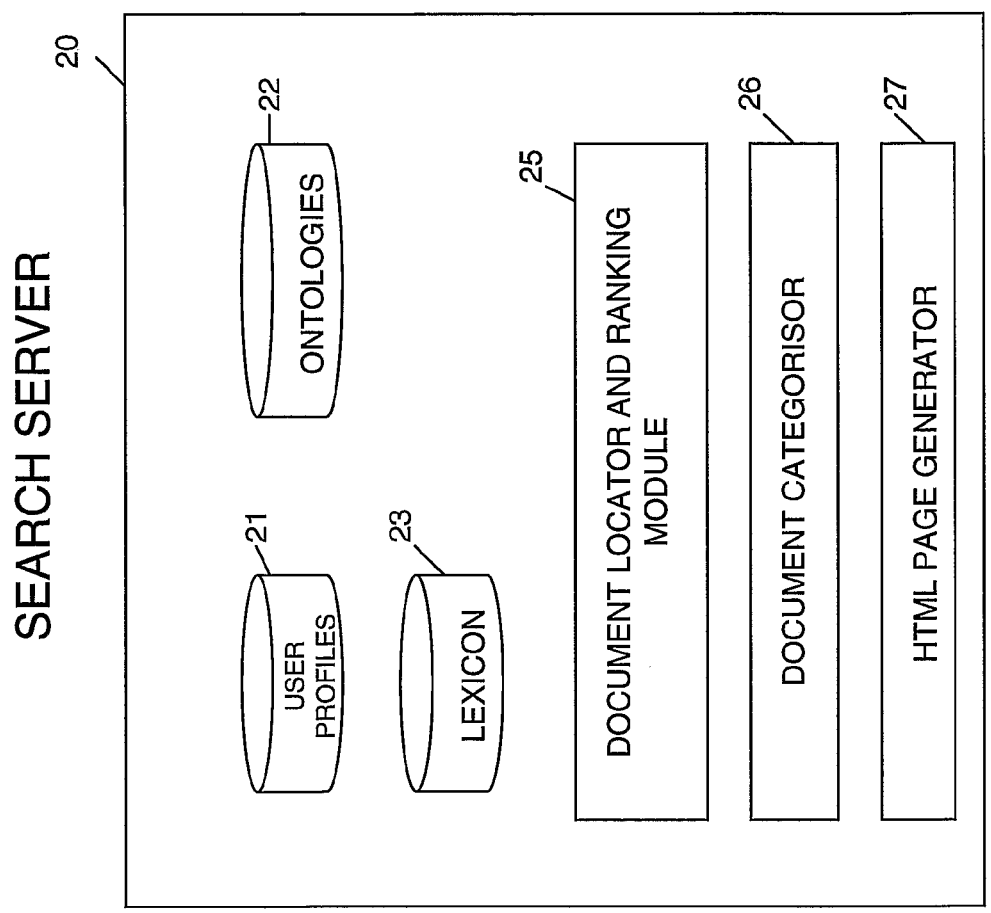
FIG. 2 is a block diagram of the search server of FIG. 1, showing the search server in more detail.

Referring to FIG. 2, the search server 20 includes a number of data stores: a user profile store 21 which stores details about each user of the search service provided by the search server 20, an ontology store 22 which stores one or more common ontologies with mappings between the ontologies (if more than one is present), and a lexicon 23 which stores a computer accessible dictionary such as WordNet which specifies different meanings of words, synonyms and relationships (such as specification of, generalisation of, etc.) between the words (or more precisely between different meanings of words, since some words may have more than one meaning). Additionally, the search server includes a number of program modules: a document locator and ranking module 25 which generates a list of "hits" in response to an input search query and ranks these into an order of likely interest to the user, a document categorisor module 26 which categorises an input document into a concept of a specified ontology or ontologies, and an HTML page generator module 27 which generates HTML pages for transmission to a remote device in response to HTML requests received from the remote device.

Of these data stores and program modules the lexicon 23 and document locator and ranking module 25 may be formed from any suitable conventional embodiment of these components (see for example WordNet's web site currently available at http://www.cogsci.princeton.edu/~wn/ for details about how to form a suitable lexicon data store 23 and see U.S. Pat. No. 6,526,440 for details about how to provide a suitable document locator and ranking module 25) and therefore these components will not be described in greater detail below, except as necessary to clarify the operation of the present embodiment. In this embodiment we use WordNet to provide the lexicon 23 which, in addition to listing multiple word senses, also lists synonyms, antonyms, hyponyms, etc. and sets out word hierarchies such as "Dog" is a sub-category of "Animal", etc.

In the present embodiment, the user profile store 21 stores details about previous actions taken by each user when using the search server, as well as details about the user. The store may also store modifications to the or a common ontology (or a set of common ontologies) stored in the ontology database which are personal to the respective user. Details about this possibility and the format of a user's previous actions are given below.

In the present embodiment, the or each common ontology is represented within data store 22 using the OWL Web Ontology Language, details of which can currently be found at http://www.w3.org/TR/owl-features/, however any ontology language could be used for this purpose.

As is well known, in the field of information technology, an ontology is typically formed by a number of nodes arranged together in a tree like structure such that a typical node has one parent node and one or more children nodes. The root node is a special node which has no parent (it is the ultimate parent of all other nodes in the ontology) and leaf nodes are special nodes which have no children. Each node has a label (a word or phrase specifying what the node represents) and may have one or more attributes (each of which will have its own name and a value or list of values, etc.). Apart from the inheritance hierarchy, each node can further specify its relationships with other nodes such as Dog and Cat are disjoint.

Figure 3:
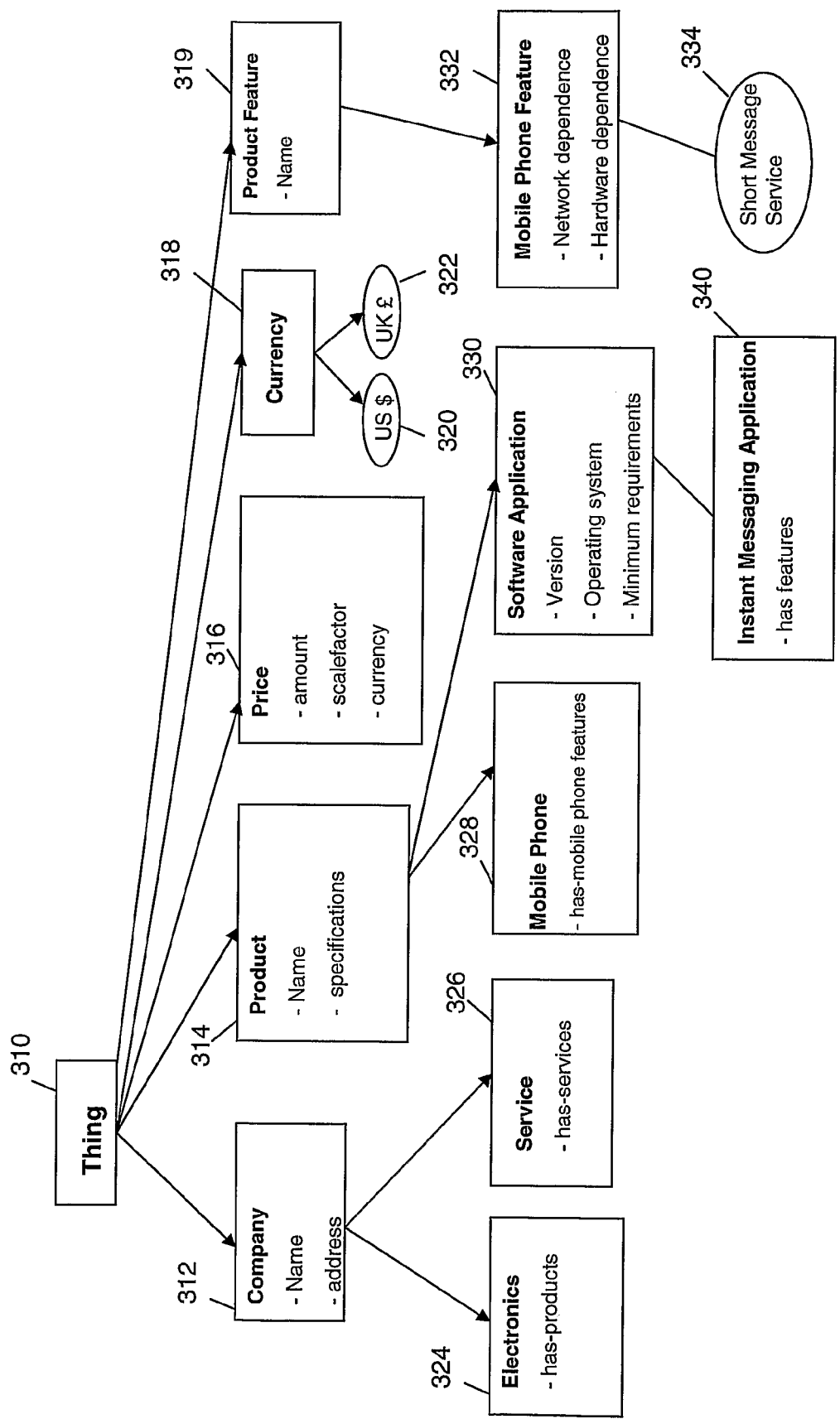
FIG. 3 is a schematic illustration of a portion of an ontology stored within the search server of FIGS. 1 and 2.

In order to illustrate this typical arrangement of an ontology, FIG. 3 shows a small part of the common ontology of the present embodiment. The root node 10 of this common ontology is labelled "Thing" and has no attributes. It does however have five direct children (illustrated—naturally it may contain many more in addition which aren't illustrated) "Company" node 312, "Product" node 314, "Price" node 316, "Currency"/node 318 and "Product Feature" node 318. "Company" node 312 is illustrated as having two attributes called "name" and "address". Generally speaking, an attribute will either store a value as a simple text string or number etc., or as another concept within the ontology. If the latter (i.e. another concept), then the attribute value may be an individual belonging to the respective node/concept to which the attribute refers. "Product" node 314 has two attributes labelled as "name" and "specification". "Price" node 316 has three illustrated attributes labelled as "amount", "scalefactor" and "currency". "Product Feature" node 319 has one attribute labelled as "name".

The "Currency" node 318 is not illustrated as having any attributes, but it is illustrated as having two individuals belonging to it, namely the US dollar and the UK Sterling pound. The "currency" attribute of the "price" node 316 is an example of an attribute which refers to another concept/node within the ontology, and, in the illustrated portion in FIG. 3, will therefore take as its value either the individual "US$" 320 or the individual "UK£" 322. The "Company" node 312 has two children nodes which are sub-concepts of the "Company" concept, "Electronics" 324 and "Services" 326. Each of these sub-concepts inherits all of the properties of its parent node 312, such that any individual member of either of these concepts would include the attributes "name" and "address" as well as the attribute(s) specific to the actual sub-class of which it is a member. In FIG. 3, sub-node 324 is illustrated as having one specified attribute "has-products". Similarly, "Services" sub-node 326 is illustrated as having a "has-services" attribute. "Product" node 314 is illustrated as having a "Mobile-phone" sub-node 328 with a sub-attribute "has-features".

Note that the ontology partially illustrated in FIG. 3 described above is a common ontology. It is possible for individual users to personalise the common ontology by imposing restrictions or alterations to the concepts contained in the common ontology. For example, the sub-concept "Mobile-phone" 328 with attribute "has-features" (as well as inherited attributes "name" and "specification") could be personalised to require that one of the features must be that the phone has at least a 2K memory. With such a personalisation, any individual of the common "Mobile-phone" concept which has less than 2K of memory would not be considered an individual belonging to the personalised mobile-phone concept and instead would be classified as simply a product for the purposes of that particular user. In this way, when the particular user refers to the concept "Mobile-phone" it means mobile phones which have at least 2K memory. In the present embodiment, in order for such a personalised ontology to be effective in screening out certain retrieved data items, it is necessary for the data sources to be appropriately structured in some way, such as, for example, including meta tags listing properties about the data item in a machine readable form, such as, for example, by being written in the form of XML documents according to schema which specify the relevant properties.

As will be recognized, such a personalized version of a common ontology can be formed by setting constraints on the allowable values or ranges of values of certain attributes or properties of concepts within a common ontology or set of ontologies.

Note that in addition to being able to obtain information from general web servers via the World Wide Web (WWW), in an alternative embodiment, the search server 20 could be located within the same intranet domain as the user and could additionally therefore (or alternatively) obtain information from data sources within the intranet, etc.

When a user wishes to carry out a search, the user accesses the home web page of the search server 20 which is then displayed on the screen of the remote terminal 10 from which the user is accessing the search server.

Figure 4:
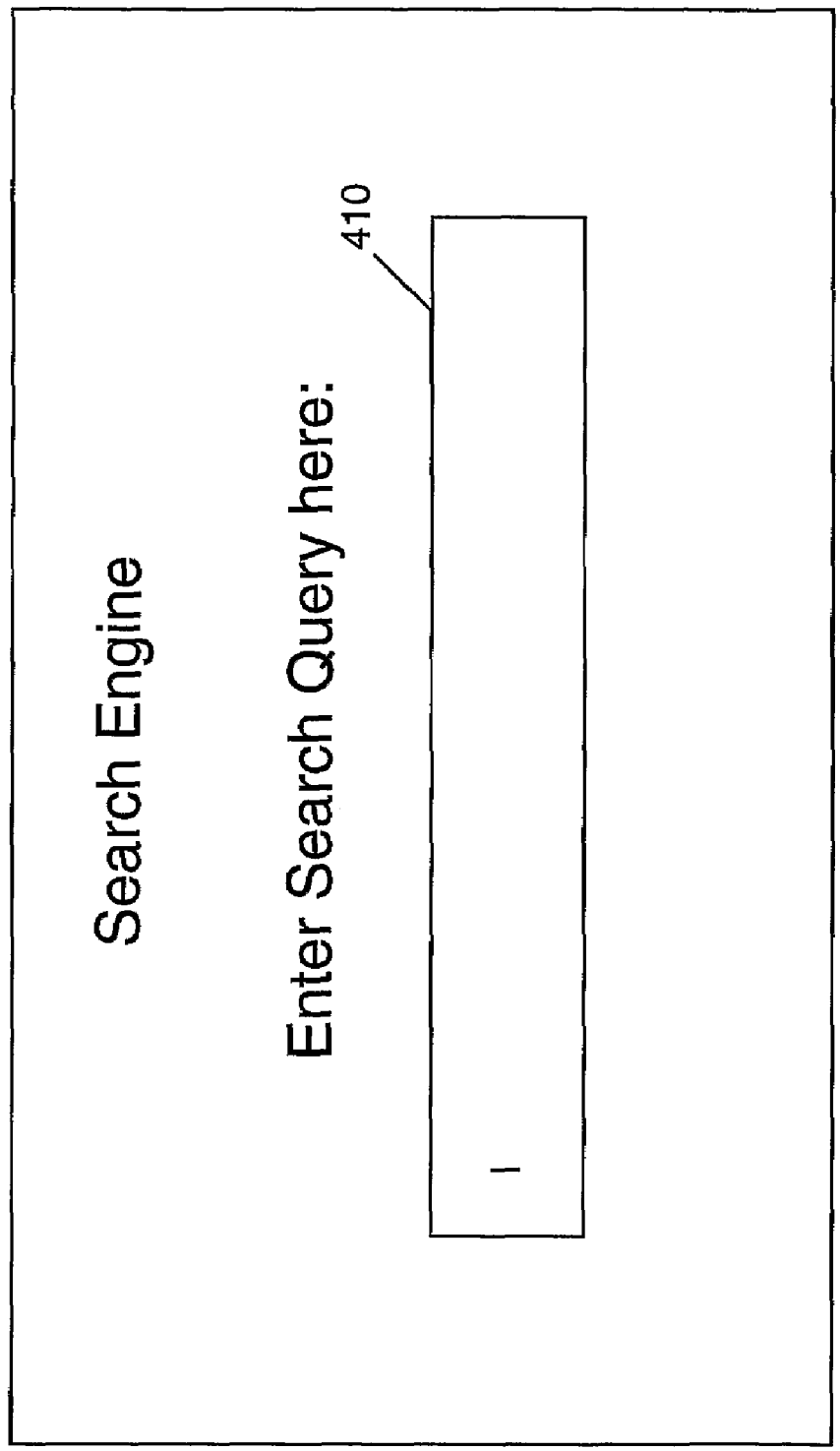
FIG. 4 is a schematic illustration of a screen-shot from a terminal display accessing a server implementing an embodiment of the present invention.

FIG. 4 illustrates (schematically) how the home page of the search server 20 is displayed on the screen of the remote terminal 10. As can be seen from FIG. 4, the home page as displayed on the remote device 10 includes a text entry box 410 into which the user may type a search query. The user is free to enter any text into the text entry box 410 and upon the user hitting the enter/carriage_return key, the text entered by the user into the text entry box is transmitted from the remote device 10 to the search server 20.

The search server 20 assumes that the text entered by the user is a natural language query such as a phrase or sentence. Consider the following example query therefore:

"Mobile phone with message"

When the search server receives this message, the first step is to "chunk" the query into phrases. There are many known algorithms for performing such chunking. The one used in the present embodiment is based on the General Architecture for Text Engineering (GATE) which was developed at Sheffield University and is consequently often referred to as the "Sheffield Gate" system (for details of which see http://gate.ac.uk). With this chunking algorithm, the above query is turned into two "chunks", namely "Mobile phone" and "message". (Note for an additional example of a suitable "chunking" algorithm, see the "Key Phrase Extraction" section of co-pending UK patent application No. 0421754.3).

The search server 20 then attempts to map each "chunk" to one or more nodes within the common (or personalised) ontology. In the present embodiment, the mapping process is performed by firstly looking for any direct matches between the respective "chunk" and any nodes in the ontology. If that succeeds, then the directly matching nodes are stored and the process ends. If there are no direct matches, the "chunks are separated into words and these are "stemmed" (again see http://gate.ac.uk or co-pending UK patent application No. 0421754.3 for details of a suitable stemming algorithm) and the algorithm looks for partial matches between the stemmed words and nodes in the ontology (e.g. if there is just one common word or part of a word between the node label and the stemmed word(s)). If some matches are found in this way, then each matched node is stored and the process ends. If no matches are found with the stemmed words, then any synonyms (i.e. words having the same meaning) of the stemmed words are looked up in the lexicon and used to search for matches with nodes of the ontology, which, if found, are stored before ending the process. If this fails to find any matches, then the lexicon is used to find generalisations and specialisations of the stemmed words and these are used to look for matching nodes in the ontology. If some matches are found in this way, then each matched node is stored and the process ends. If no matches are found the process ends and, in the present embodiment, no categories are selected and the search proceeds in an entirely conventional way and the search results are presented to the user in an ordinary uncategorised list of the results ordered by some measure of relevance.

In the present example therefore, the chunk "Mobile phone" is directly matched to the "Mobile Phone" concept/node 328. The "message" chunk in the (telecommunications biased) common ontology of the present embodiment is not directly matched to any node/concept in the common ontology. However, after performing word stemming of "message" to get "message" this is then partially mapped to both individual node 334 ("message" is partially mapped to the word "message" in the label "short message service") and to concept/node 340 ("message" is partially mapped to the word "messaging" in the label "Instant Messaging Application").

As part of the matching process, some techniques may be employed to prioritise certain matches over others based on the context of the input search query as a whole. A number of different techniques may be used (separately or in combination) in order to achieve this. For example, the ontology itself may be used to try to determine whether certain possible matches are more likely than others. For example, in the common ontology in the present example, node 328 (to which the first chunk of the input query has been matched) has as an attribute, a reference to node 332, which has as an individual member node 334 (which is one of the two possible mappings of the second chunk). On the other hand, there is no such linkage between nodes 328 and 340 (the other possible match of the second chunk). On this basis the possible mapping of the second chunk "message" of the input query to node 334 may be preferred over the possible mapping to node 340 (of course this assumes that Instant Messaging is not represented in the common ontology as a mobile phone feature—if mobile phones started including such a feature than the ontology should be updated to reflect this and then neither mapping would be preferred over the other).

Another technique for helping to prefer one matching over another may use a database of related word lists. Such related word lists could be generated automatically (either in advance and then stored or on the fly), for example, using some of the features of WordNet. For example, consider the input query "software in java". This would be chunked into "software" and "Java". These two terms could be looked up in the lexicon. In the case where the lexicon is formed using WordNet the first term has only one sense, whereas "Java" returns 3 different senses (an island, a type of coffee and an object oriented programming language); one could generate related word lists for each of these senses (e.g. using the definitions of each of the three senses, possibly with the definitions resulting from searching for immediate synonyms, hypernyms and hyponyms of each of these senses as well) and then use the related word lists to see if the first chunk (i.e. "software") appears in any of these lists (in this case it should appear only in the related word list corresponding to the third sense), and if so one can deduce that the user probably intended that meaning of the term. In a large, general ontology it is likely that each of these three different senses of the word java will have its own separate node/concept. Each such node could be explicitly linked to a corresponding one of the senses of the word java known by the lexicon, or alternatively a process of looking for other matching words from the related word lists in parent nodes (or otherwise closely related nodes) within the ontology could be used to match the determined sense to the corresponding node in the ontology.

If the matching process is successful in finding some matches with nodes in the ontology, then the matched nodes are used as categories into which the search engine will attempt to place the results of the search. Thus, in the present embodiment, the original search query (e.g. "Mobile phone with message") is entered to the document locator and ranking module 25 (which, as mentioned above, is simply a conventional search engine), which returns a ranked list of "hits". The ranked "hits" are then input to the document categorisor module 26 which uses an algorithm to attempt to categorise each of the returned documents into one of the matched categories. In the present embodiment the algorithm used by the categoriser simply comprises storing a list of keywords in respect of each node of the ontology and searching each returned document to see if it contains the listed keywords. If the document contains at least a minimum number of the listed keywords it is classified as belonging to the respective category. Clearly it may be possible to have more sophisticated rules by having, for example some anti-keywords, which if present will make the document less likely to be categorised into the respective category, etc. Also, key phrases may appear in the list and the distance (in terms of number of words) between keywords or phrases can also be used to help in the categorisation, etc.

Note that if the matched concepts have sub-concepts (i.e. children nodes, for example in the case of the concept 328 "Mobile phone" it could have sub-concepts such as "Nokia", "Sony Ericcson", etc. In such a case, if any of the documents can be categorised into either a parent or a child concept, then the document is categorised into the child document as this is more specific than the parent concept/node.

Figure 5:
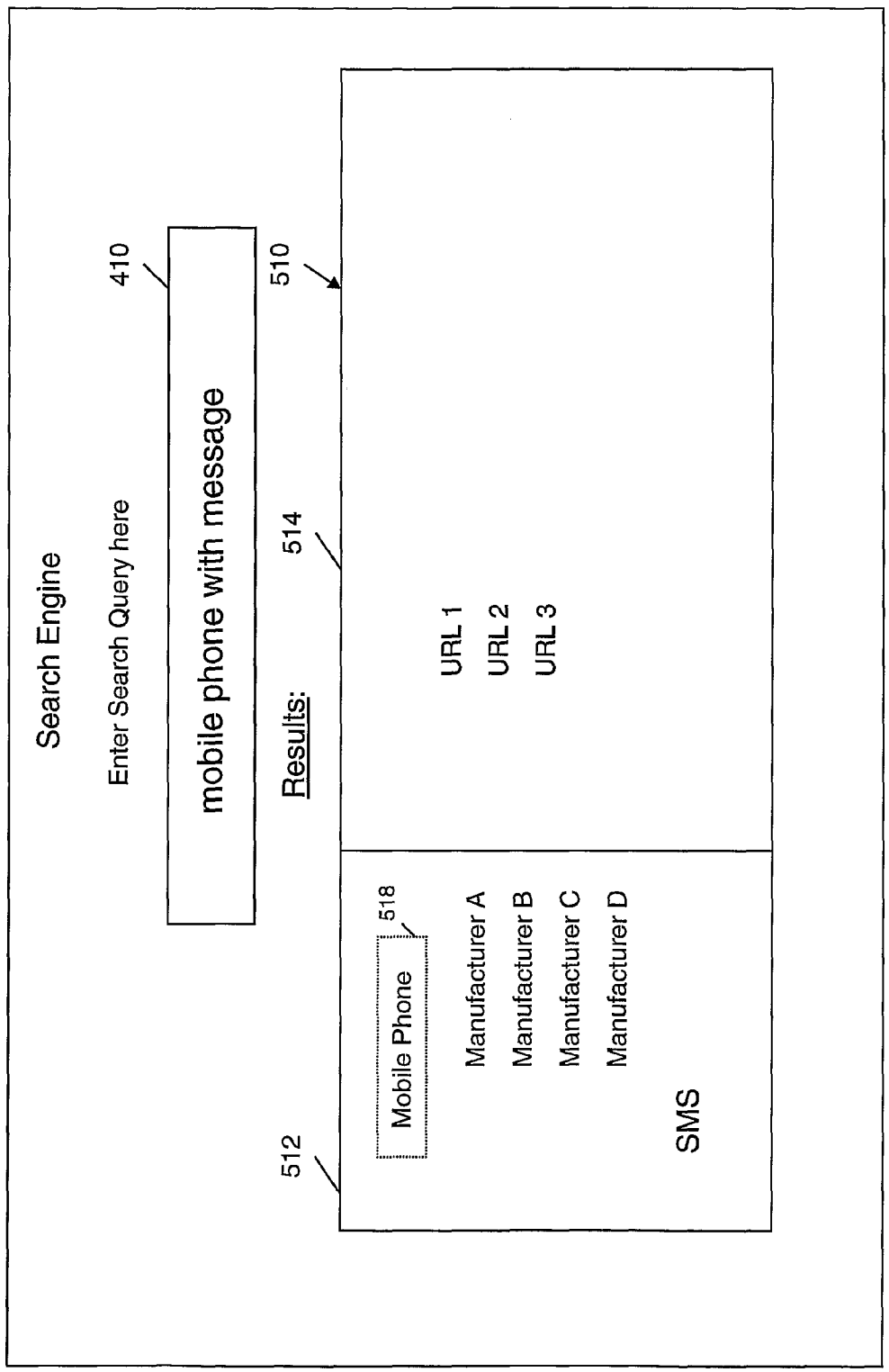
FIG. 5 is a schematic illustration of a follow-on screen-shot from that of FIG. 4.

FIG. 5 illustrates how the results of the search in the present case are presented to the user on the screen of the remote device 10. As in the earlier screen, there is still a text entry box 410 in which the just entered search query continues to be displayed and into which the user may enter a new search query at any time. Underneath the text entry box is a results display area 510. The results display area is separated into two sub-areas, a left hand panel 512 displaying a hierarchical or expandable tree-view of various categories (corresponding to nodes in the common or personalised ontology) and right hand panel 514 which displays the URL's corresponding to the hits from the most recent search as categorised in the category in the left-hand panel 512 which currently has the focus. At any time, one of the categories shown in the left hand panel will have the focus (as illustrated in FIG. 5 by the dotted box 518 surrounding the category "Mobile Phone") and this can be changed by the user at any time by clicking onto another one of the categories in the left hand panel. In the present embodiment, if the user clicks on one of the URL's displayed in the right hand panel 514, then a new window is opened by the browser application to display the HTML content corresponding to the clicked URL (in an alternative embodiment the content corresponding to the clicked URL could be displayed within the right-panel instead of in a new window).

It will be apparent to the reader that the left-hand panel 512 presents to the user a display which is similar to the classic directory tree structure view provided by many operating systems and other applications in which directories and sub-directories are arranged in a hierarchical arrangement. One significant difference with the display in the left-hand panel of the present embodiment however is that the order in which the nodes are displayed, as well as the depth to which nodes are expanded, is highly variable and configurable. This contrasts with a standard viewer in which the depth to which the tree is expanded along any particular branch or branches is variable (typically the system will have some default sort of settings for how expanded the tree should be—e.g. by keeping the tree as unexpanded as possible except for the branch containing a certain selected file or directory, or by remembering the exact state of the tree when the respective application was last closed, etc., with the possibility of the user overriding any default settings to manually determine which branches are expanded and to what extent). However, in any event the actual ordering of the nodes is not variable in a standard conventional viewer (and is typically done simply in alphabetical order). By contrast, in the present embodiment, the order in which nodes appear in the tree view of the left hand panel 512 is varied in such a way that in general the nodes believed to be of most interest at present to the user are presented towards the top of the panel with nodes which are increasingly believed to be of less relevance being presented generally lower down in the left-hand panel. The extent to which this may be achieved is constrained somewhat by still wishing to present parent nodes as higher up than their children nodes respectively (in the present embodiment) and indented to the left. However by placing the tree view in a scroll-pane this can be accommodated to some extent (i.e. by placing parent nodes of the most relevant node above the current position of the "top" of the sliding pane such that they are out of view unless the user scrolls upwards to see them).

In the present embodiment, a number of strategies are used to try to determine the best order in which to present nodes in the left-hand panel in order to achieve the objective of seeking to present the most relevant nodes at the top of the panel. The most important such method is that of referring to the past actions of the respective user as stored in the user profile store 21. In the present embodiment, these are simply stored as triplets of <user id, category 1, category 2> where user id is a unique identifier of the user in question, category 1 is a category viewed (i.e. selected and thus brought into focus by the user in the left-hand panel 512) and category 2 is the next category viewed by the user after viewing category 1. Up to a certain number of these will be stored (in a first-in first-out manner) in the database providing the user profile store 21. When the user clicks on a category in the left-hand panel 512, the user profile store 21 is searched for all triplets for the respective user for which the clicked on category appears as category 1. If some of these triplets show that one category appears as category 2 more often than any other, then an attempt will be made to bring this category as high up the tree view list as possible, and so on for less popular follow-on categories. Where there is a tie in terms of the frequency with which categories appear as category 2, the most recent triplets are preferred over older ones, for ordering purposes.

If the user is highlighting a category for the first time (or at least for the first time in a sufficiently long time that the user profile store 21 has already deleted any such record), the history can be used simply as a general guide as to categories which are popular with the user and these can be presented higher up the order. In an alternative embodiment however, a search could first be performed for any previous history of viewing parent or grand-parent, etc. categories to the current category and determining possible nest categories based on the associated category 2 terms for any such ancestor categories, etc.

Referring back to FIG. 5 now, whilst the mobile phone category is the one in focus 518, the right-hand panel displays a list of URL's relating to documents which concern mobile phones and SMS, but are not specific to any particular one of manufacturers A-D, at the top with the URL's of increasingly less relevant documents (e.g. those concerning mobile phones in general but not referring to SMS) being displayed progressively lower down the list. If the user were to click on one of the categories specific to a particular manufacturer, the right-hand panel would change to a list of URL's specific to that particular manufacturer, again with the URL's of increasingly less relevant documents being displayed progressively lower down the list. Note that the URL's categorised into the SMS category would correspond to documents which discuss SMS in fairly general terms without being specifically about any particular type of mobile phone, etc. Also note that the ranking of documents by relevance is performed by the conventional document locator and ranking module based on the input search query as explained above.

As mentioned above, the arrangement of nodes in the left-hand panel 518 is automatically reconfigured on a dynamic basis in dependence upon the user's past actions, etc. In the present embodiment, such reconfiguration is done either after a predetermined amount of time has lapsed since a new category has been highlighted by the user, or after the user has clicked on a URL in the right-hand panel 514, however, other triggers could be used in alternative embodiments.

As mentioned above, the current category is used together with the user's history in order to determine the ordering of categories in the left-hand panel 512, where possible, when the left-hand panel is dynamically changed without a new search query having been entered. If, however, the user has no history, the category of the first attribute associated with the current page category which corresponds to a concept defined in the ontology (e.g. Mobil Phone concept 328 has an attribute has-mobile-phone-features whose type is that of "mobile phone feature" which corresponds to concept "Mobile Phone Feature" 332) is displayed immediately beneath the currently in-focus category when the rearrangement of the categories in the left-hand panel 512 is triggered. Note that when this is done, the category will in a sense appear twice because it will be available both immediately underneath the in focus category of which it is an attribute and also in its own right as it were as part of the tree structure representing the entire ontology through which the user is able to navigate at will much as with an ordinary tree viewer.

If the history search is successful, all of the second categories found (in order of frequency and/or recency) are displayed beneath the currently in focus category followed by the previously displayed hierarchy. As an example, assuming the user has brought into focus a "Sony product" category and then triggered a dynamic re-arrangement of the left-hand panel (e.g. by viewing a URL corresponding to that category), if the user history profile shows that after viewing the Sony product category he often goes to the "Retailer" category, then the Retailer category will be displayed underneath the Sony product category. In a variant, as well as the next category, a part of or the entire downstream hierarchy of the next category is also displayed. Thus in the case that the Retailer category has sub-categories of High-Street-Shop and Online-retailer, these would also be displayed underneath the Retailer category. In the event that instead of (or in addition to) sub-categories, a particular category has individuals, these can be displayed under the category.

Note that the user may not always want the tree view in the left-hand panel to change dynamically and in such cases he can configure an option to disable this feature. Furthermore, since the re-arrangement is performed by the search server generating and transmitting a new HTML page to the remote device, the user may use the backwards and forwards buttons on his web browser to navigate between different arrangements as well if he wishes to return to an earlier arrangement, etc.

In one embodiment, instead of including all of the nodes (with most irrelevant nodes being "collapsed") representing the entire ontology as well as any dynamically generated categories, only the relevant categories may be displayed. Alternatively, the left hand panel could display two separate trees (with separate root nodes) one of which is the entire ontology (in collapsed form so you only see the root node) and the other of which contains just the categories relevant to the respective search query.

An additional feature provided in the present embodiment is for the system to sometimes look ahead in order to determine how best to display the node hierarchy in the left panel. The look ahead uses two following categories from the user history. For example, consider a case where a user is searching through an internal database of students within a university department. In this database, each student includes amongst its details, details of the course(s) being taken by that student:

Student
    Course: Courses
    Year: Year

The courses offered by the department are also stored in the database in a hierarchical fashion:

Courses
    AI courses
        Reasoning courses
          Deductive
          Abductive
    Information Courses
        Database
        Web If the user's history shows that he frequently follows the route Student>Courses>Student then when the user clicks on the category Student the left-hand panel then the system deduces that the user may be interested in knowing about students as categorised by the course(s) they are taking. As such, a search for a student results in the following display appearing in the left-hand panel:

AI Students
    Reasoning Students
        Deductive Students
        Abductive Students
Information Students
    Database Students
    Web Students Where the most appropriate attribute (as determined by the user's history profile) of the category student has been expanded according to the hierarchy of the attribute's (i.e. course's) associated concept (i.e. course) to form a compound category.

Note that this example also illustrates how the present invention may be applied to searching through structured datasources such as structured databases (e.g. relational databases). In particular, the present invention is particularly well suited to structured data sources comprising a large number of disparate data sources which have been integrated using an ontology based integration device such as that described in the following published International patent applications: WO 02/080026; WO 02/080028; WO 02/080029; and WO 03/0025. In such cases, instead of sending the original search query as entered by the user to a conventional keyword based search engine, a structured query is generated from the input query after pre-processing the input query using the common ontology or ontologies to rule out unlikely structured queries, etc. The above mentioned patent applications provide more detail on how to convert a natural language query into an appropriate set of structured queries for accessing an integrated set of heterogeneous data sources and are hereby incorporated into the present application by way of reference in this respect. Naturally, when using structured data sources, the results will already be appropriately categorized in terms of the common ontology and so this process will not be required. However, the manner in which the information is presented to the user with the left hand panel of the GUI altering the order in which categories are presented is unaffected by the nature of the data sources being searched.

What is claimed is:

1. A method of automatically searching through a store of electronic documents, the method comprising:
   controlling a user interface to permit a user to enter a search term;
   carrying out a search using the search term;
   categorizing the documents returned by the search into a plurality of distinct categories; and
   controlling the user interface to present the documents returned by the search, or references thereto, in a grouped manner such that documents of a particular category are grouped together, wherein the categories are selected in dependence upon the search term,
   wherein the categories are selected by identifying concepts within a personalized ontology which match words from the search term to use as the categories, and wherein the personalized ontology is formed by setting constraints on the allowable values of attributes of concepts within a common ontology.

2. A method according to claim 1 wherein the categories are selected by processing the search term together with a common ontology or set of ontologies.

3. A method according to claim 2 further including:
   using a stored history of the user's previous searching actions in combination with hierarchical information contained in the ontology or set of ontologies, to generate a new set of sub-categories to present to the user,
   wherein the new set of sub-categories is generated by expanding an attribute of a base category, which attribute refers to another concept in the ontology or set of ontologies, in accordance with the stored hierarchy of the concept in the ontology or set of ontologies to which the attribute refers, to generate sub-categories of the base category, whereby search results are subsequently categorized in accordance with the values of the selected attribute into respective ones of the newly generated sub-categories.

4. A method according to claim 2 wherein at least one or some of the categories are dynamically generated from the ontology by combining concepts from the ontology to form compound categories.

5. A method according to claim 1 wherein the search is a keyword based search.

6. A method according to claim 1 wherein the search term is converted into a structured query which is used to query one or more relational databases.

7. A server computer for assisting a user, using a remote device, to search through a set of documents available to the user stored on devices connected to the same data network to which the server and the remote device are connected, the server including:
   means for receiving from the remote terminal a search term,
   means for carrying out a search using the search term,
   means for categorizing the documents returned by the search into a plurality of distinct categories, and
   means for returning output data to the remote terminal which permits the remote terminal to present to the user the documents returned by the search, or references thereto, in a grouped manner such that documents of a particular category are grouped together, wherein the categories are selected in dependence upon the search term,
   wherein the categories are selected by identifying concepts within a personalized ontology which match words from the search term to use as the categories, and
   wherein the personalized ontology is formed by setting constraints on the allowable values of attributes of concepts within a common ontology.

8. A computer-readable storage medium containing a computer program or suite of programs for causing the method of claim 1 to be carried out during execution of the program or programs.

9. A method of automatically searching through a store of electronic documents, the method comprising:
   controlling a user interface to permit a user to enter a search term;
   carrying out a search using the search term;
   categorizing the documents returned by the search into a plurality of distinct categories; and
   controlling the user interface to present the documents returned by the search, or references thereto, in a grouped manner such that documents of a particular category are grouped together, wherein the categories are selected in dependence upon the search term,
   wherein the categories are selected by identifying concepts within a personalized ontology which match words from the search term to use as the categories,
   wherein the personalized ontology is formed by setting constraints on the allowable values of attributes of concepts within a common ontology, and
   wherein the retrieved documents are only categorized into a category associated with a concept of the personalized ontology for which one or more constraints have been set if the documents satisfy the or each constraint set for that associated concept in the personalized ontology.

* * * * *